Sept. 27, 1938.  F. C. HUNT ET AL  2,131,376
FRUIT CURTAIN
Filed Aug. 19, 1935   2 Sheets-Sheet 1

INVENTORS.
Findley C. Hunt,
Leigh J. McGrath.
BY Chas. E. Townsend.
ATTORNEY.

Sept. 27, 1938.　　　F. C. HUNT ET AL　　　2,131,376
FRUIT CURTAIN
Filed Aug. 19, 1935　　　2 Sheets-Sheet 2

INVENTORS.
Findley C. Hunt,
Leigh J. McGrath.
BY
Chas. E. Townsend.
ATTORNEY.

Patented Sept. 27, 1938

2,131,376

UNITED STATES PATENT OFFICE 2,131,376

FRUIT CURTAIN

Findley C. Hunt, San Francisco, and Leigh J. McGrath, San Mateo, Calif., assignors to Zellerbach Paper Company, San Francisco, Calif., a corporation of Nevada Application August 19, 1935, Serial No. 36,836

3 Claims. (Cl. 217—3)

This invention relates to a curtain or cover member for fruit and other commodities, which are packed in baskets, crates, and like containers, and especially to a cover member which will protect the fruit against dust and exposure and which is preferably of a transparent character to permit display of the fruit without removal of the curtain.

The object of the present invention is generally to improve and simplify the packing, displaying and protection of fruit which is packed in baskets, crates, and like containers; to provide a cover or curtain which will promote sanitation by excluding dust, flies, insects, etc., and prevent touching or handling of the fruit while on display; to provide a cover or curtain which is transparent in character to permit display of the fruit without removal of the curtain; and, further, to provide a cover or curtain which may be readily applied during packing of the fruit and just as readily removed when the entire contents or a portion of the fruit is to be removed.

The invention is shown by way of illustration in the accompanying drawing, in which—

Figure 2:
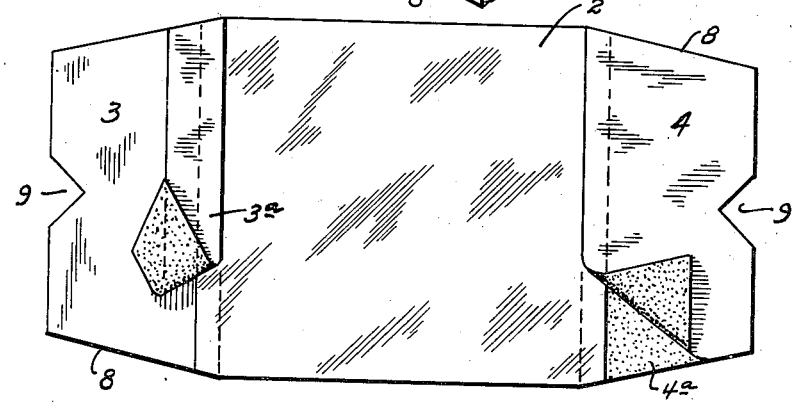
Fig. 2 is a plan view of the cover or curtain member.
Figure 3:
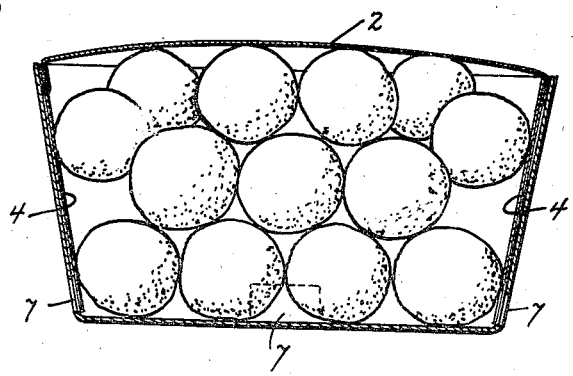
Fig. 3 is a central cross section taken on line III—III of Fig. 1.
Figure 4:
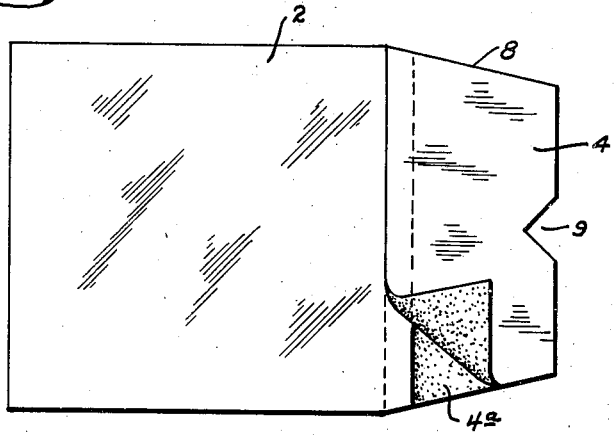
Fig. 4 is a plan view of a fruit curtain with one panel attached thereto.
Figure 5:
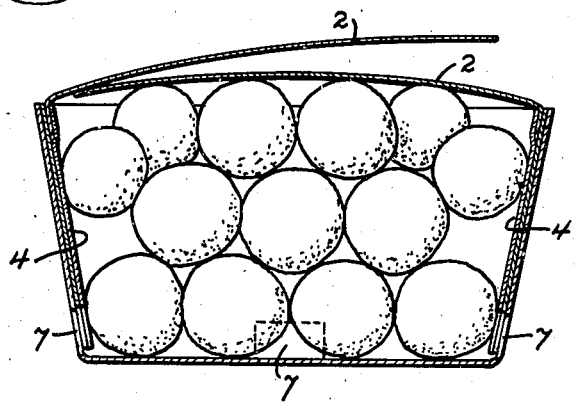
Fig. 5 is a central cross section of a fruit basket, or container, showing two fruit curtains placed therein and overlapping each other.

Referring to the drawing in detail, and particularly Fig. 2, it will be noted that the fruit curtain comprises a sheet of thin transparent material such as indicated at 2, said sheet being constructed of transparent cellulose or like material, and having a pair of panels attached thereto such as indicated at 3 and 4. The panels may be made of any suitable rigid or semi-rigid material such as heavy paper, cardboard, chipboard, etc., and suitable means may be employed for securing or joining the several members with relation to each other.

The panel shown at 3 is attached to one side of the transparent sheet by means of a strip of gummed tape, as shown at 3a. The panel indicated at 4 is attached in a different manner and consists of two sections of thin cardboard, or like material, such as shown at 4 and 4a, said sections being gummed together and the side edge of the sheet 2 being secured between them.

The curtain is intended as a temporary protection and covering for containers packed with fruit or other commodities. In actual practice any type of container may be employed, such as baskets, lug boxes, crates, etc. The fruit is packed by placing it in layers directly in the container and when completely filled or packed the panels are inserted between the fruit and the sides of the container in a position where the transparent sheet will cover the fruit.

In other instances a cover is applied to the container and the container is placed upside down. The transparent sheet is placed against the inner surface of the cover and the panels against the sides thereof. The fruit is then placed in position and when the container is packed the bottom section is applied, when it is ready for storage or shipment.

Plainly speaking the method of packing a box or container varies and forms no part of the present invention, as the protecting cover may be applied to the container after the fruit is packed or prior to packing the same, depending upon the method of packing employed.

In some instances a curtain will be employed which is provided with a panel at each side thereof, as shown in Fig. 2. In other instances the sheet 2 will have a panel attached to one side only. In either, one or two curtains may be employed by inserting one panel in one side of the box and the other panel in the other side and permitting the transparent sheets to overlap the other. That type is convenient as it merely requires lifting of the transparent sheets to permit removal of a portion of the fruit when it is on display or sale, and it may then be folded back to cover the fruit remaining in the box.

By employing two curtains of the type shown in Fig. 2, that is, placing them crosswise of each other the fruit placed in the basket or box is so completely sealed or covered that any chance of dust, dirt, or foreign matter entering is almost nil. Insects, such as flies, etc., are obviously excluded and the chance of individuals handling or pressing the fruit when on display is also obviated, the covering here employed discouraging any attempt of that character.

Figure 1:
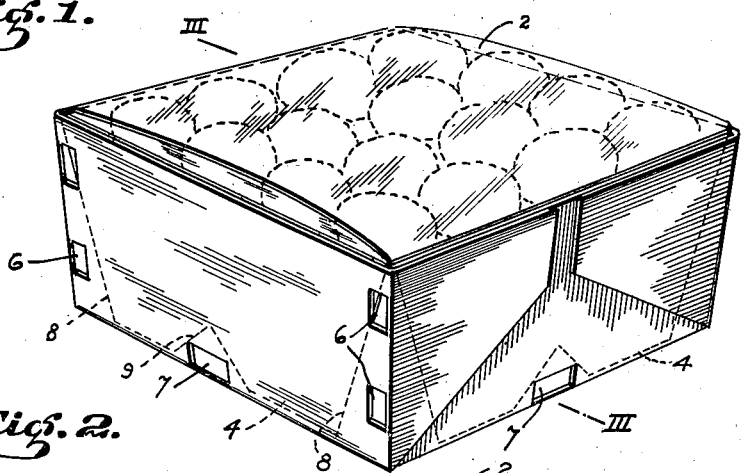
Fig. 1 is a perspective view of a basket packed with fruit, said drawing showing the position of the cover or curtain member when applied.

In the shipping and storing of containers packed with fruits it is usually necessary to insure ventilation and the baskets or containers are usually provided with openings in the sides and bottom portion, as shown at 6 and 7, to permit circulation of air. The panels employed in the present instance are cut on angles at the ends, as shown at 8, and the free edge is notched, as shown at 9, hence when they are inserted between the fruit and sides of the baskets or box they will assume the dotted line position shown in Fig. 1, leaving the ventilated openings free to permit air circulation.

The transparent material employed may be clear, or it may be colored pink, amber, or whatever produces the best display, it being found that certain colors render certain fruits more effective in appearance than others, hence a variety of colored transparent sheets is desirable for different types of fruit and other commodities. The panels may similarly be colored if desired.

The cost of an article of this character is exceedingly small and as the time required in applying same when a container is packed with fruit is small there can be no objection from the packer's or producer's angle, and obviously it is desirable from the purchaser's point of view as an individual purchasing a container packed with fruit in this manner will know that it has been fully protected against dust, exposure, flies, handling, and so on; hence the curtain facilitates sales of the product displayed and also promotes keeping qualities and sanitation.

While certain features of the present invention are more or less specifically described, we wish it understood that various changes may be resorted to within the scope of the appended claims. Similarly, that the materials and finish of the several parts employed may be such as the manufacturer may decide, or varying conditions or uses may demand.

Having thus described our invention, what we claim and desire to secure by Letters Patent is:

1. A cover member of the character described comprising a thin sheet of transparent material, a panel member disposed at one side thereof, said panel comprising two sections of thin cardboard gummed together with one edge of the transparent sheet secured between them.

2. A cover member of the character described comprising a thin sheet of transparent material, a substantially rectangular shaped panel member having one side edge secured to the transparent sheet, and the opposite side edge of the panel being notched to form a ventilating opening.

3. A cover member of the character described comprising a thin sheet of transparent material, a substantially rectangular shaped panel member having one side edge secured to the transparent sheet and the ends of the panel being cut on an angle to provide ventilation.

FINDLEY C. HUNT.
LEIGH J. McGRATH.